Nov. 3, 1970     E. L. PIPKIN ET AL     3,538,493

SONAR SYSTEM

Filed May 22, 1969     2 Sheets-Sheet 1

Edward L. Pipkin
Julius C. Wicke, Jr.
Garrett G. Salsman
                   INVENTORS

BY

Don D. Doty
               Attorney

Edward L. Pipkin
Julius C. Wicke, Jr.
Garrett G. Salsman
INVENTORS

BY

Don D. Doty
Attorney 3,538,493
SONAR SYSTEM
Edward L. Pipkin, Julius C. Wicke, Jr., and Garrett G. Salsman, Panama City, Fla., assignors to the United States of America as represented by the Secretary of the Navy
Filed May 22, 1969, Ser. No. 826,967
Int. Cl. G01s 9/66
U.S. Cl. 340—3
11 Claims

ABSTRACT OF THE DISCLOSURE

In the subject invention, a sonar is combined with a suitable signal generator in such manner that predetermined noise signals are broadcast prior to, simultaneously with, or shortly after the broadcast and reception of echo-search signals, so as to effect clearance of the subaqueous search volume of most biological types of acoustical energy scatterers and/or absorbers.

BACKGROUND OF THE INVENTION

Heretofore, sonar systems have been employed to search for and acquire numerous different types of underwater target objects. In so doing, acoustical energy has been broadcast throughout a given area or volume of water, and in the event a target is present therein, reflected acoustical echoes are received therefrom which may be indicative of its size and character. Unfortunately, sea water or like is a rather poor acoustical transmission medium at best, and when it is filled with various fish or other sea animals it is even worse, because any acoustical energy impacting thereon is either absorbed or scattered to a certain extent thereby. Hence, the presence of such sea animals causes the acoustical search and echo signals of a target seeking sonar to be somewhat attenuated, thereby reducing the strength of the received signal to the extent that it is often very difficult, if not impossible, to distinguish between desired targets and natural objects located within the water. Of course, in addition, such sea animals as fish, shrimp, turtles, etc., usually ensonify their ambient subaqueous environment with their own peculiar sounds and noise, which obviously adversely reduces the signal-to-noise ratio of any given sonar operating in proximity therewith to a considerable extent. Consequently, although adequate for many practical purposes, the sonar systems of the past and the operational results obtained therefrom are still in dire need of being improved.

SUMMARY OF THE INVENTION

The present invention overcomes some of the aforementioned disadvantages of the prior art target search systems, in that it increases the fidelity of the target image readout for any given operational power. Such improvement is effected by the very simple but profound expedient of removing many of the fish and sea animals that adversely affect sonic energy transmission within sea and fresh water from the area being searched for predetermined targets at any given time. Their removal is accomplished by means of generating a noise or other signal having characteristics that are frightening to such sea animals and timely broadcasting it before, simultaneously with, or shortly after the broadcast of sonar echo-search signals. Hence, in order to produce such signals, the subject invention combines a suitable sonar with an appropriate underwater acoustical signal generator and an interlinking programmer for coordinating or synchronizing the broadcast of both thereof as necessary to be most effective during any given operational circumstances. Said noise signals, of course, frighten such fish and sea animals away from the search volume, thereby leaving it clear and uncluttered for the transmission of the sonar search and target echo signals.

It is, therefore, an object of this invention to provide an improved echo-search ranging system.

Another object of this invention is to provide a more efficient sonar system for locating and identifying targets disposed within a subaqueous medium, including sea water and the like.

Still another object of this invention is to provide a method and means for increasing the signal-to-noise ratio during the echo-search-ranging operation of target search and identification systems, regardless of the environmental medium involved.

It is a further object of this invention to provide a more efficient sonar system which operates with increased signal-to-noise ratio during the search for, acquiring of, and identification of various and sundry targets located within sea water or any other subaqueous or liquid medium.

Still another object of this invention is to provide a more efficient target search and identification system which requires less power for any given operational circumstances.

Another object of this invention is to provide an improved method and means for substantially clearing a volume of water of fish and other biological type sound absorbers and scatterers.

Still another object of this invention is to provide a method and means for increasing the efficiency of sonar operations in bays, estuaries, rivers, and lakes, as well as in shallow and deep ocean waters.

A further object of this invention is to provide an improved method and means for controlling, within limitations, a predetermined biological environment, including sea water or the like.

Other objects and many of the attendant advantages of this invention will be readily appreciated as it becomes better understood by reference to the following detailed description when considered in conjunction with the accompanying drawings wherein.

Figure 1:
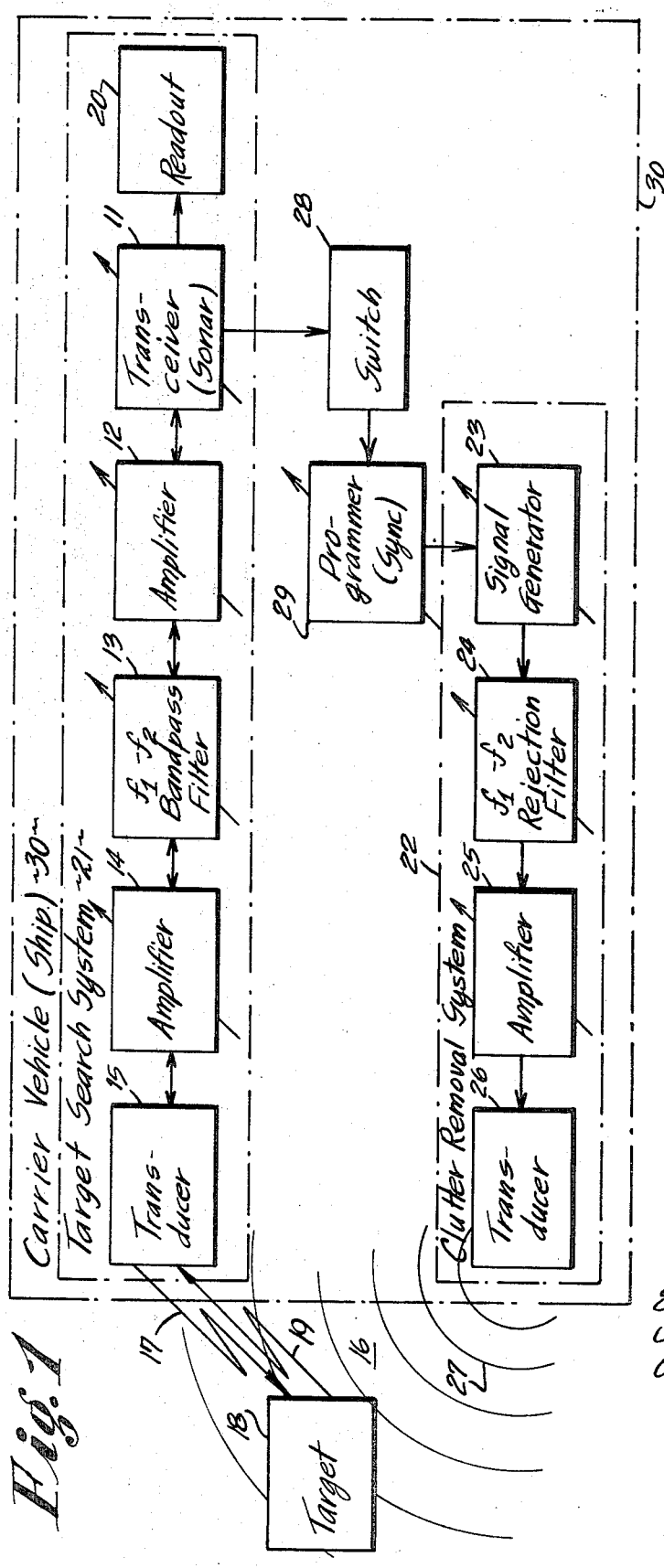
FIG. 1 is a functional block diagram of the subject invention.

Referring now to FIG. 1, there is shown a transceiver 11, which, as previously suggested, may be any suitable type of echo-search-ranging device which facilitates the locating of and identifying various and sundry targets within a predetermined environmental medium. Although, in this particular instance, the device of FIG. 1 should be considered as being general in nature, it should also be understood that it should also be considered as being specific in nature as well, inasmuch as the primary structure thereof and the primary intended use thereof is to be that of a sonar system. In this particular embodiment echo-search-ranging transceiver 11 is considered to be one which is capable of being varied in specific frequency or in frequency band, so as to optimize it for the search and identification of any particular target object, as desired.

The output of transceiver 11 is connected through a variable amplifier 12 to the input of a $f_1$–$f_2$ bandpass filter 13. Obviously, the frequency band which is passed by bandpass filter 13 is either a matter of design choice or the choice of the human operator who is using the subject invention. Accordingly, bandpass filter 13 is indicated as being a variable bandpass filter which may be manually or otherwise adjusted to be operationally suitable during any given circumstances. The making of such choice, of course, would be well within the purview of either the artisan or the operator making and using this invention if he had the benefit of the teachings presented herein.

The output of bandpass filter 13 is connected through another variable amplifier 14 to the input of the transducer 15. It, of course, should again be understood that the type of transducer employed as transducer 15 should be such as would operate satisfactorily within the environmental medium within which the aforementioned various and sundry objects are being searched. Therefore, in the event the environmental medium being searched at any given instance is sea water or the like, transducer 15 would be an electroacoustical transducer appropriate therefor; but in the event the environmental medium were something other than sea water or the like—for instance, in the earth's atmosphere, or outer space—it should be so designed as to properly function therein. Likewise, in order to simplify the disclosure of this invention, transducer 15 is described herewith as being a reversible transducer, in that it will both transmit and receive echo search signals; however, the subject invention should not be considered as being limiting thereto, since separate transmitting and receiving transducers may be used in lieu thereof, if so desired.

For the purpose of locating and identifying objects within the environmental medium 16, suitable signals 17 are broadcast in search of a target 18, the acquiring of which causes echoes 19 to be reflected therefrom back to the aforementioned transducer 15, as will be discussed more thoroughly subsequently in the discussion of the operation of the subject invention.

For the purpose of indicating and/or recording the target information received by transceiver 11, a readout 20 is connected to one of the inputs thereof.

As may readily be seen from FIG. 1, the portion of the system described so far constitutes a target search and identification system 21, and it is with this system that the remainder of the invention is associated with and/or attached to, which readily improves the efficiency thereof. Hence, the biological clutter removal system portion 22 of the invention will now be described.

Included in the aforementioned clutter removal system 22 is a variable signal generator 23, which is capable of producing any type of output signal that will frighten away or otherwise remove biological animals from within the ambient environment. For the purpose of this disclosure, the degree of design sophistication thereof is left to the artisan, inasmuch as for most practical purposes signal generator 23 may merely be a noise generator, if so desired. On the other hand, if a greater purity of operation is required during any given situation, signal generator 23 may be so designed as to operate at a particular frequency or at frequencies which exclude the operational frequency band $f_1$–$f_2$ that act as the operative signal within the aforementioned target search and identification system 21 of the invention. But to simplify this disclosure as much as possible, the output signal of generator 23 will be called a noise signal.

The output of signal generator 23 is connected to the input of a variable rejection filter 24 which, as the name implies, should be so designed as to reject the frequency band falling within the aforesaid $f_1$–$f_2$ frequencies. The output of rejection filter 24 is connected through a variable amplifier 25 to the input of another transducer 26. Transducer 26, like the aforementioned transducer 15, is of such structure as makes it suitable for the environmental medium within which it is operating. Transducer 26 may be merely a transmitting transducer, if so desired, or it may be similar to the aforesaid transducer 15. Thus, for example, if the environmental medium is sea water, transducers 15 and 26 are both of the electroacoustical type. As may readily be seen from FIG. 1, and as will be discussed in greater detail later on, transducer 26 is intended to broadcast signals 27 within the ambient environment 16 and preferably in such direction as to be directed toward the volume thereof being searched for target objects.

For the purpose of appropriately correlating or synchronizing the broadcasting of echo-search and clutter removal signals, a series connected selector switch 28 and variable programmer 29 are connected between transceiver 11 and signal generator 23, which, of course, effectively times or synchronizes target search system 21 and clutter removal system 22.

As a general rule, the aforementioned structure constituting the subject invention is physically located on a carrier vehicle 30 which is sufficiently mobile to carry it into the vicinity of whatever targets are being sought. It too, should be designed in such manner as to facilitate its traveling within whatever environment is pertinent during any given operational circumstances. Hence, for example, it may be a ship or submarine designed for travel on or in the ocean or any other body of water, it may be an aircraft, or it could possibly be a spacecraft, if necessary.

In addition, it is entirely possible that the subject invention could be used to the best advantage by being mounted on a fixed platform which is either located on land or at sea, as operational circumstances require.

All of the elements depicted in block form in FIG. 1 are well known and conventional per se. It is, therefore, to be understood that it is their unique interconnections and interactions that effect the new combination of elements and provide the new method constituting this invention.

MODE OF OPERATION

From the foregoing, it may be inferred that it is intended that the subject invention be used predominantly to improve sonar operations within an aqueous medium; however, it should be understood, as previously suggested, that the invention is not to be limited thereto, inasmuch as the principle involved is applicable to many types of echo-search-ranging apparatus such as, for instance, atmospheric sonar systems, radar systems, infrared systems, and any other sonic or electromagnetic systems or combinations thereof, regardless of the environmental medium within which such energy is respectively being transmitted and received for target acquiring and identifying purposes. Making the transition from one to the other would, of course, be well within the purview of one skilled in the art having the benefit of teachings presented herewith, since so doing would ostensively only involve the making of design choices pertinent to the respective ones thereof. With this understanding, the operation of a preferred sonar embodiment of the subject invention will now be discussed in conjunction with all of the figures of the drawing.

Figure 2:
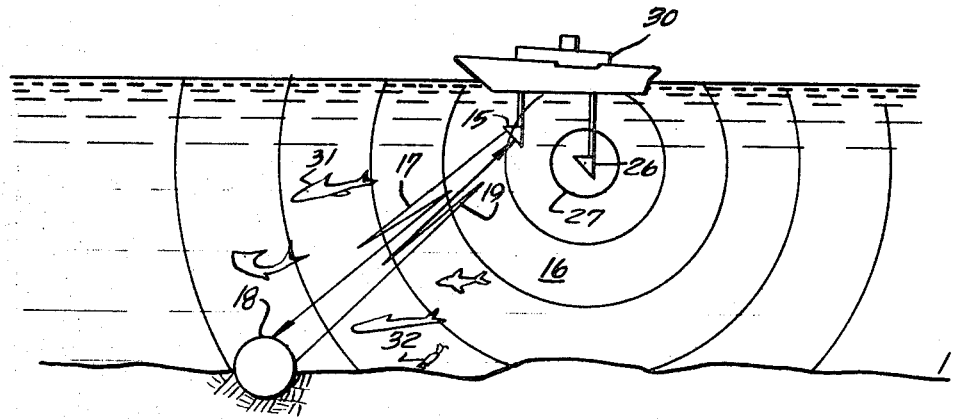
FIG. 2 is a quasi-pictorial view of the manner in which the subject invention may be used.

As depicted in FIG. 2, in the event target 18, laying on the sea floor, is to be located and identified, ship 30 carrying the subject invention would traverse the surface of the water, broadcast target search signal 17, and receive echo signals 19 reflected from said target 18 by means of transducer 15, as is conventional during the operation of most of the known sonar systems at the present time. But because there may be many schools of fish 31, shrimp 32, or other marine animals swimming or otherwise moving through the aqueous environment traveled by said sonar signals 17 and 19, they may be distorted by the spurious noise made thereby or by the absorption or scattering effects produced thereby. As a result, the sonar signal-to-noise ratio quite often leaves a great deal to be desired. In any event, the amplitude of received signal 19 is considerably lower, due to its having been attenuated thereby during both the search and echo travel stages of the operation. But, when a predetermined noise or other signal 27 is timely broadcast from transducer 26 throughout the volume of water containing search and echo signals 17 and 19, it has the effect of frightening (or perhaps orienting with respect to the direction thereof) most of the fish 31 and shrimp 32, as well as numerous other marine animals having a deleterious influence on the transmission and reception thereof, thereby substantially or effectively clearing said volume of water thereof.

Figure 3:
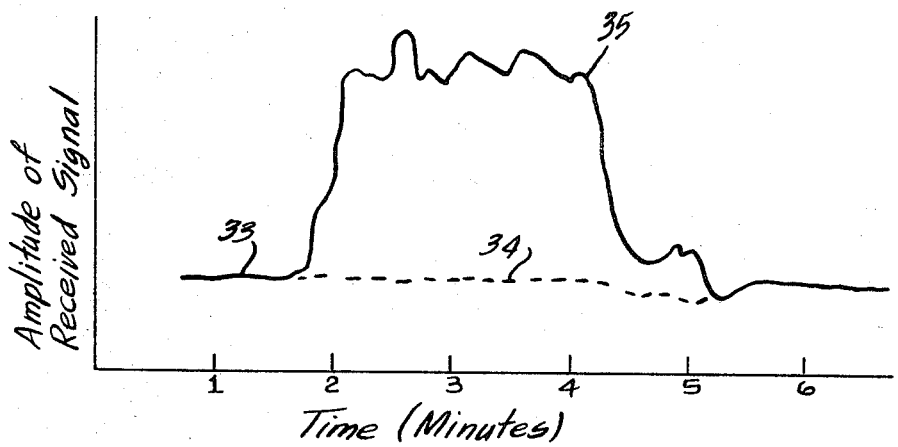
FIG. 3 is a graphical representation which depicts the typical improvement obtained in the signal strength of signals received by the subject invention compared to those received by the sonar systems of the prior art.

Referring now to FIG. 3, a curve 33 and a dashed-line extension 34 thereof are shown as a typical representation of an echo signal received from a sonar target without benefit of the clutter remover system portion of the invention being operative. Although useful for some purposes, it may be seen that the amplitude thereof is susceptible to being improved. However, if noise signal 27 is broadcast at some time during the echo-search operations, it has been determined that the amplitude of the received signal is increased considerably. Such increase is illustrated by curve 35. Accordingly, it may readily be seen that the subject new combination of elements— which includes the clutter removal system portion of the invention—vastly improves underwater target acquisition and identification because the signal-to-noise ratio is improved.

It has been found that several modes of operation are possible, as far as timing is concerned: one, where the noise signal is broadcast before the broadcast of the sonar search signal; another, where the noise signal is broadcast simultaneously with the broadcast of the sonar search signal; and still another, where the noise signal is broadcast at some time after the broadcast of the sonar search signal. Of course, all produce the desired results of removing interfering marine life from the subaqueous search volume to a certain extent; but, at times, one may be better than the others, depending on the type and number of marine animals involved, the sea state, and other conditions which may or may not be evident at the time. Therefore, at times, it is preferable to vary the respective times of noise and search signal broadcast, in order for the human operator to determine what timing relationship is best during any given operational circumstances. To make this possible, the programmer portion of the invention is employed.

As previously suggested, in most target search operations, a certain frequency or band of frequencies are employed in the search signals. The one or ones selected is, of course, contingent upon the type of target being sought and the environmental medium in which it is located. Hence, in order to maintain as clean a search signal as possible, the $f_1$–$f_2$ bandpass filter 13 is included in target search system 21, where $f_1$ and $f_2$ define the lower and upper extremities of the frequencies of the signals passed and thus broadcast thereby.

Moreover, in order to further prevent the clutter removal noise signal from interfering with the aforesaid search signals, $f_1$–$f_2$ rejection filter is incorporated in clutter removal system 22, where, in this case, $f_1$ and $f_2$ represent the lower and upper extremities of the frequencies of the band of frequency signals not passed and broadcast thereby. Thus, it may readily be seen that substantially no $f_1$–$f_2$ band of noise signals interferes with the $f_1$–$f_2$ band of broadcast search signals and, accordingly, both signals are optimized for best possible performances, respectively.

In the event it is necessary or desirable to control the relative times of broadcast of said sonar and noise signals, the timing thereof may be effected by manually adjusting selector switch 28 and programmer 29 which are connected between target search system 21 and clutter removal system 22. The proper setting of the timer of programmer 29, of course, enables the sonar search signals to be transmitted at the same time as the clutter removing noise signals are transmitted or at any optimum time therebefore or thereafter. Or, in the alternative, in the event the relative timing thereof is of no importance during any given operational circumstances, selector switch 28 may be set to an open position, thereby effectively disconnecting programmer 29 from both transmission systems 21 and 22. Obviously, when switch 27 is open, systems 21 and 22 have no synchronizing or timing relationship, unless such is provided by a human operator operating each independently from the other.

In the preferred embodiment disclosed herewith, the entire invention is shown as being located at substantially the same place; however, it should be understood that, if so desired, the target search system and the clutter removal system may be physically separated, as long as they are positioned in such manner that the clutter removing noise signals and the echo-search signals timely ensonify the same volume of water or other environmental medium.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included therein:

What is claimed is:

1. An improved method of locating and identifying a target object disposed within a subaqueous medium, comprising the steps of:

broadcasting a first acoustical signal in such manner as to ensonify a given volume of said subaqueous medium for a predetermined time period, with said first acoustical signal having such characteristics as will cause it to frighten substantially all target object echo-search signal interfering and sound generating, absorbing, and scattering marine animal life away therefrom;

broadcasting a second acoustical signal within said given volume of subaqueous medium at a predetermined time relative to the time of broadcast of the aforesaid first acoustical signal, with said second acoustical signal being a target object echo-search signal having such characteristics as will facilitate its being impacted on and reflected from said target object located therein; and receiving the echo of said second acoustical signal within the aforesaid subaqueous medium after it has been reflected by said target object.

2. The method of claim 1 wherein:

said second acoustical signal is broadcast within a predetermined frequency band; and said first acoustical signal is broadcast at predetermined frequencies which exclude the frequency band of said second acoustical signal.

3. The method of claim 1 further characterized by the step of timing the broadcast of said first and second acoustical signals in such manner as will cause substantially all of the target object echo-search signal interfering and sound generating, absorbing, and scattering animal life to be removed from the given volume of subaqueous medium being ensonified and searched thereby, respectively.

4. The method of claim 3 wherein:

said second acoustical signal is broadcast within a predetermined frequency band; and said first acoustical signal is broadcast at predetermined frequencies which exclude the frequency band of said second acoustical signal.

5. The method of claim 3 wherein the timing of the broadcast of said first and second acoustical signals is such that the broadcast of the first thereof precedes the broadcast of the second thereof by a given time interval.

6. The method of claim 3 wherein the timing of the broadcast of said first and second acoustical signals is such that they occur simultaneously within said given volume of subaqueous medium.

7. The method of claim 3 wherein the timing of the broadcast of said first and second acoustical signals is such that the second thereof precedes the broadcast of the first thereof by a given time interval.

8. The method of claim 3 further characterized by the step of reading out said received second acoustical signal in terms of the characteristics of the target object from which it was reflected.

9. An echo-search-ranging system, comprising in combination:

means for broadcasting a predetermined target echo-search signal within a predetermined environmental medium;

means for receiving said predetermined target echo-search signal after it has been reflected from a target;

means for timely broadcasting another signal throughout the volume of said predetermined environmental medium searched by the aforesaid target search signal, said another signal having such characteristics as will frighten substantially all of the target echo-search signal interfering animal life away therefrom.

10. The invention according to claim 9 further characterized by adjustable means connected between said target echo-search signal broadcasting means and said another signal broadcasting means for selectively timing the broadcasting of said another signal with respect to the broadcasting of said target echo-search signal in accordance with a predetermined program.

11. The invention of claim 9 further characterized by a readout means connected to the output of the aforesaid receiving means.

References Cited

UNITED STATES PATENTS

| | | | |
|---|---|---|---|
| 3,317,889 | 5/1967 | Barrand | 340—5 |
| 3,360,769 | 12/1967 | Lord | 340—3 |

RICHARD A. FARLEY, Primary Examiner

U.S. Cl. X.R.

181—0.5; 340—5, 1